US008221113B2

(12) United States Patent
Schad et al.

(10) Patent No.: US 8,221,113 B2
(45) Date of Patent: Jul. 17, 2012

(54) SWIVEL MOUNT FOR AN INJECTION DRIVE

(75) Inventors: Robert D. Schad, Toronto (CA); Stephen Mracek, Toronto (CA)

(73) Assignee: Athena Automation Ltd., Vaughan (CA)

( * ) Notice: Subject to any disclaimer, the term of this patent is extended or adjusted under 35 U.S.C. 154(b) by 64 days.

(21) Appl. No.: 12/974,967

(22) Filed: Dec. 21, 2010

(65) Prior Publication Data

US 2011/0151048 A1 Jun. 23, 2011

Related U.S. Application Data

(60) Provisional application No. 61/288,624, filed on Dec. 21, 2009, provisional application No. 61/371,245, filed on Aug. 6, 2010.

(51) Int. Cl.
*B29C 45/22* (2006.01)
(52) U.S. Cl. .................. 425/574; 264/328.11
(58) Field of Classification Search .................. 425/574; 264/328.11
See application file for complete search history.

(56) References Cited

U.S. PATENT DOCUMENTS

| | | | | |
|---|---|---|---|---|
| 4,773,842 A * | 9/1988 | Aoki | | 425/574 |
| 5,306,135 A * | 4/1994 | Okubo | | 425/574 |
| 5,388,983 A * | 2/1995 | Hehl | | 425/575 |
| 5,670,186 A * | 9/1997 | Nishimura et al. | | 425/574 |
| 5,780,078 A * | 7/1998 | Chen | | 425/574 |
| 6,447,282 B1* | 9/2002 | Miyauchi | | 425/574 |
| 7,399,179 B2* | 7/2008 | Schultz et al. | | 425/574 |
| 7,524,184 B2* | 4/2009 | Hsu | | 425/574 |
| 2007/0087080 A1* | 4/2007 | Weinmann | | 425/574 |
| 2011/0052749 A1* | 3/2011 | Nishimura et al. | | 425/574 |

* cited by examiner

*Primary Examiner* — Tim Heitbrink
(74) *Attorney, Agent, or Firm* — Bereskin & Parr LLP/S.E.N.C.R.L., s.r.l.

(57) ABSTRACT

An injection molding machine includes a base, a platen mounted to the base for supporting a mold portion and a linear support fixed to the base. A retainer is coupled to the linear support and is translatable relative to the linear support along a longitudinal axis between a retracted position and an advanced position. The injection molding machine also includes an injection unit slidably supported on the linear support and coupled to the retainer. The injection unit is pivotable relative to the retainer and translatable with the retainer relative to the linear support. The injection unit includes a bearing surface resting directly upon the linear support for transferring weight of the injection unit thereto.

20 Claims, 13 Drawing Sheets

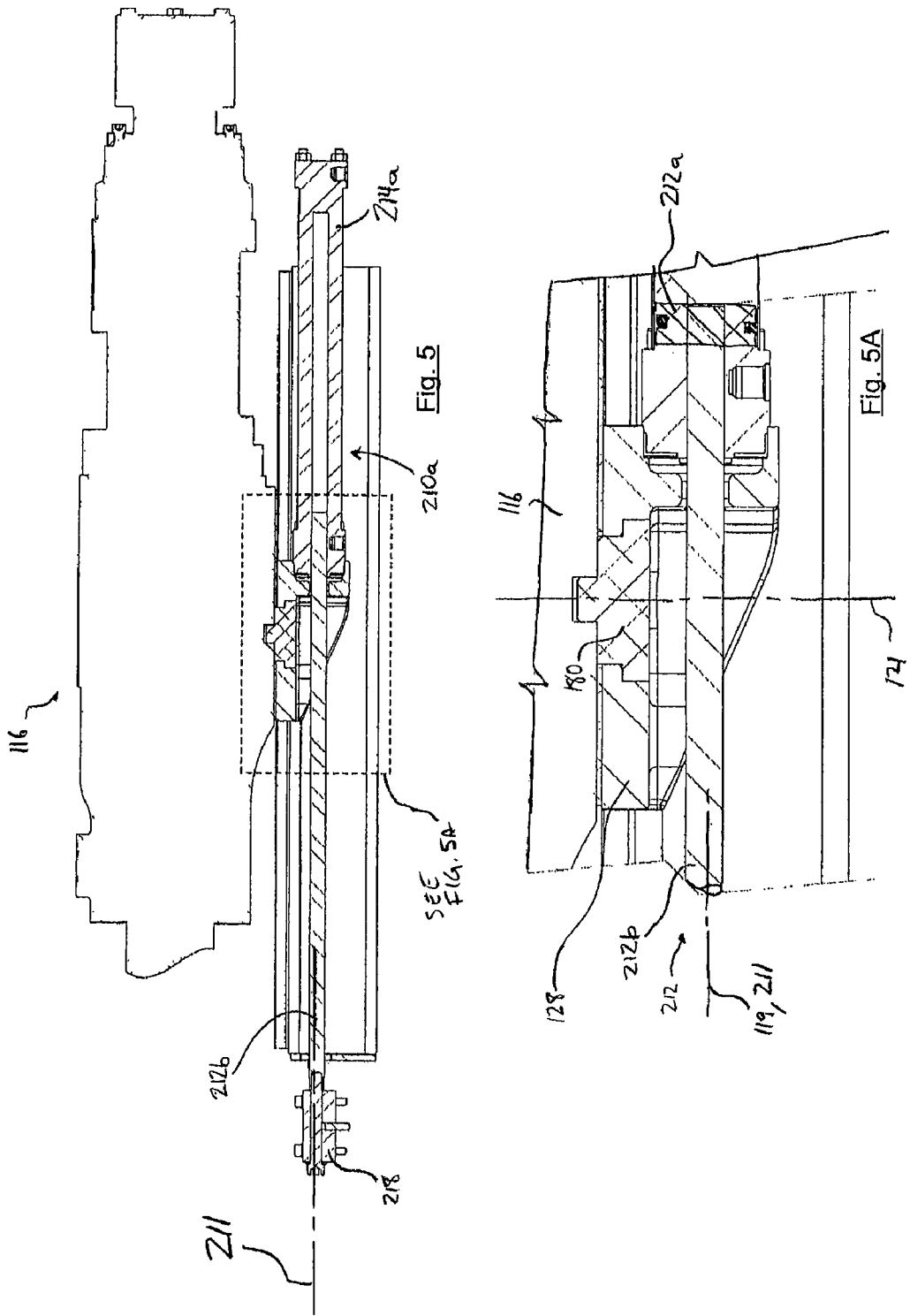

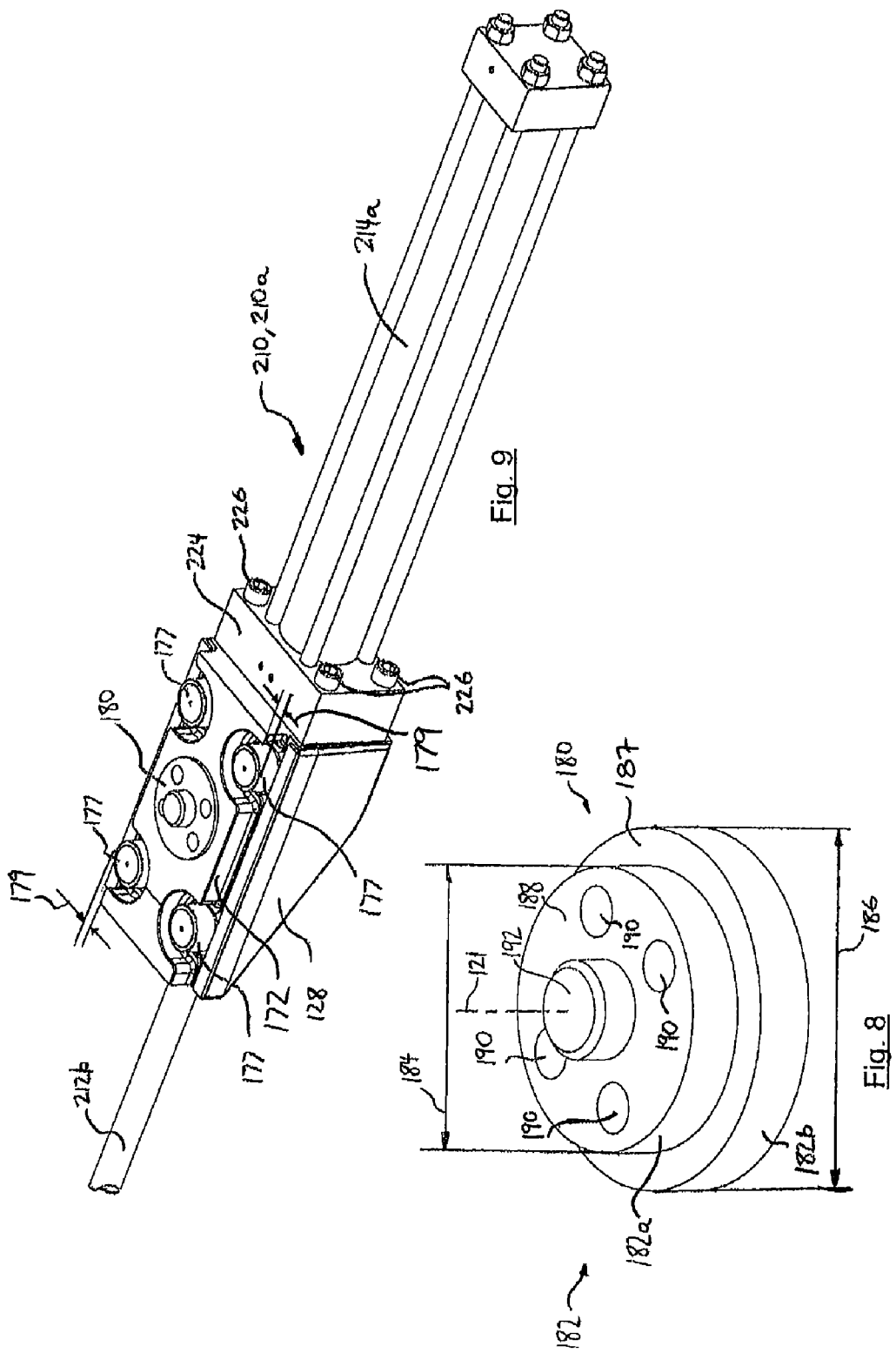

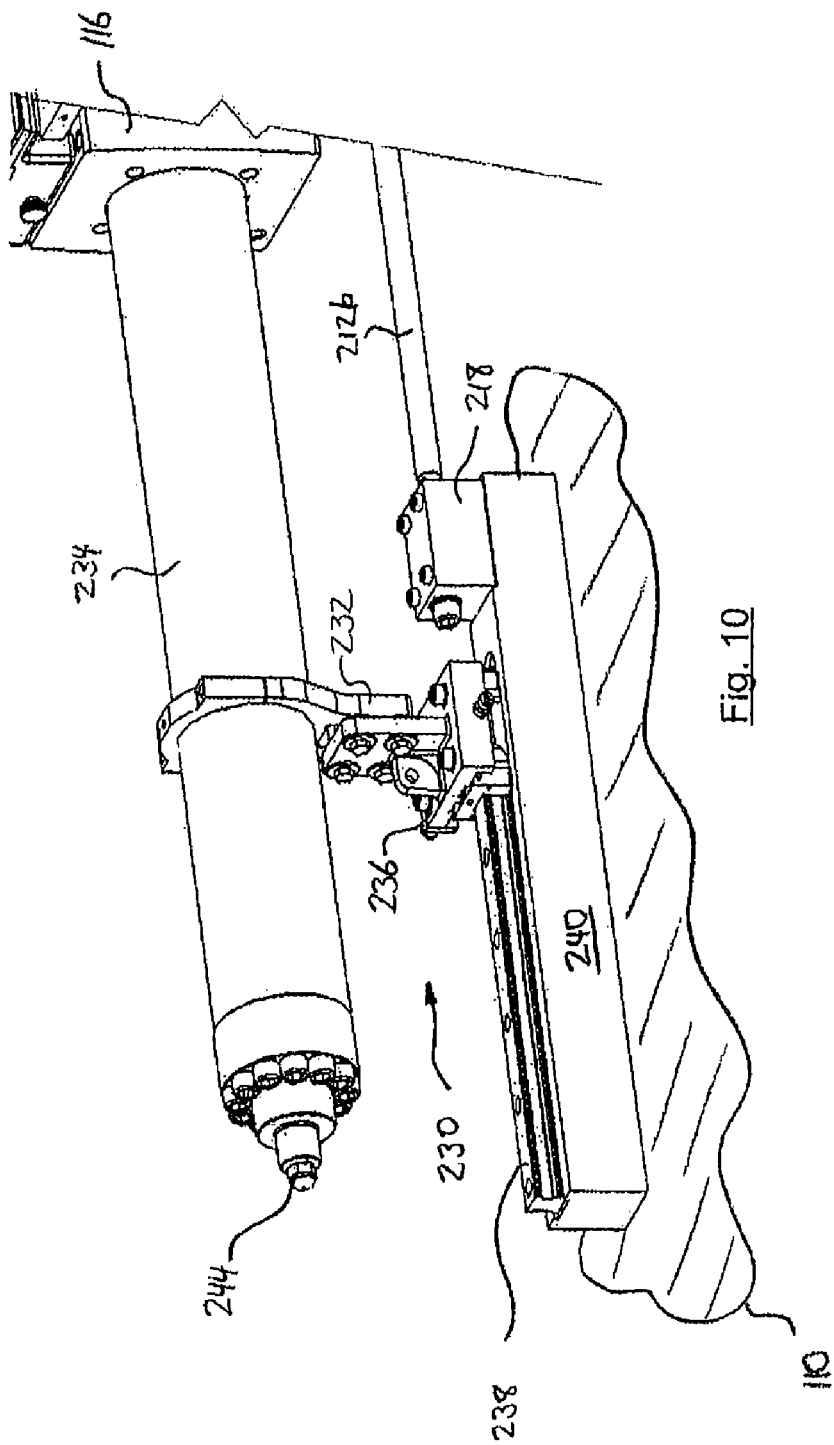

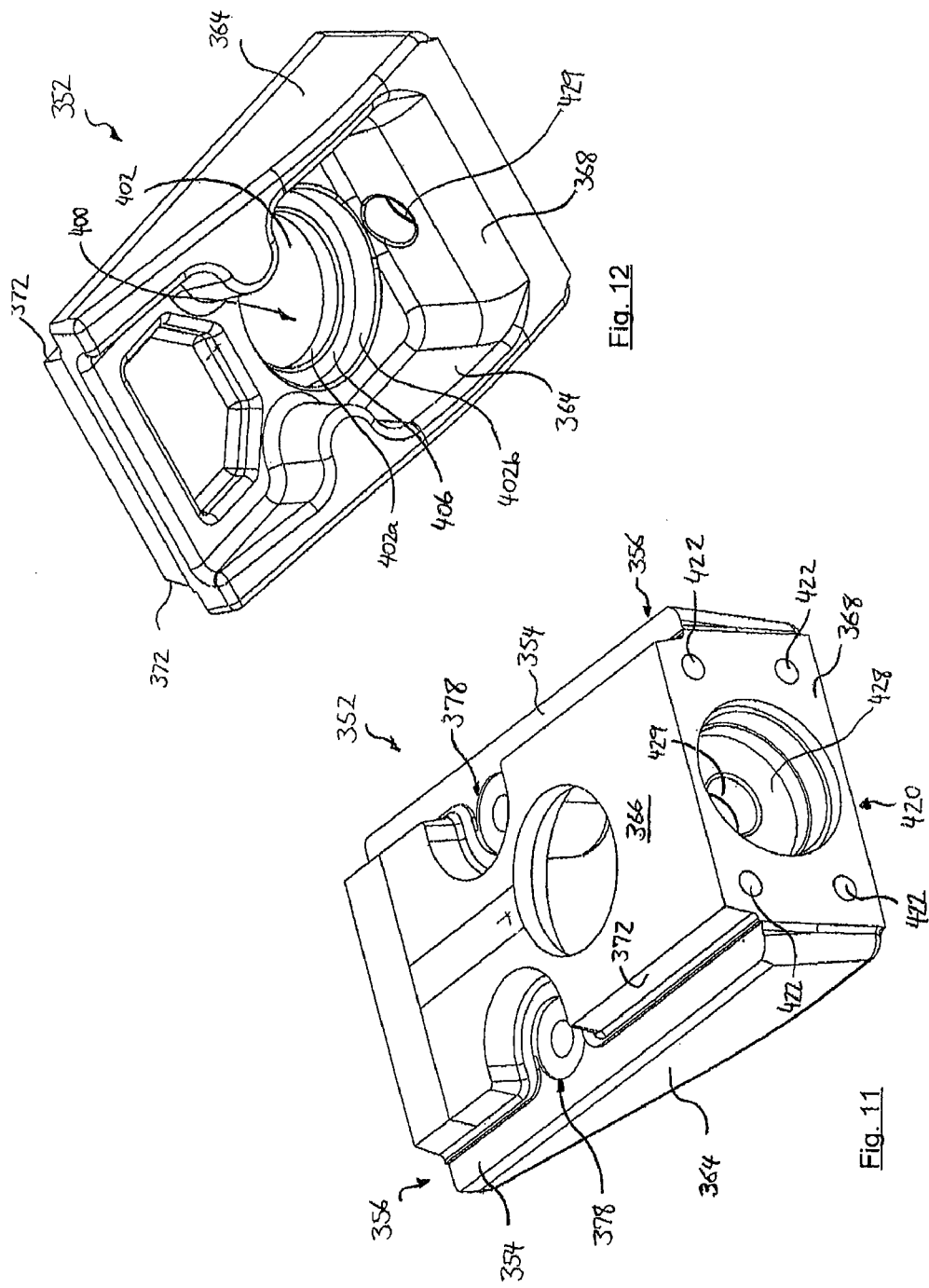

SWIVEL MOUNT FOR AN INJECTION DRIVE

This application claims the benefit of Provisional Application Ser. No. 61/288,624, filed Dec. 21, 2009 and No. 61/371,245, filed Aug. 6, 2010, each of which are hereby incorporated herein by reference.

FIELD

The Applicant's teachings disclosed herein relate to injection molding machines, elements thereof, and methods and apparatuses for movably supporting injection units on an injection molding machine base.

BACKGROUND

U.S. Pat. No. 6,447,282 (Miyauchi) discloses an apparatus capable of smoothly swiveling an injection unit of medium or large motor-driven injection molding machine. The apparatus comprises: a slide base 17 which is provided on a frame 15 so as to be linearly movable; injection unit bases 18a and 18b which are stacked on the slide base 17 so as to be relatively movable and on which an injection unit 10 is mounted; a nozzle touch mechanism having ball screw feed mechanisms 22 and 23 for converting the rotation of a motor 21 into thrust for the slide base 17; a pivot 24 for pivotably connecting the injection unit bases 18a and 18b to the slide base 17; a pivot pin 25 for restricting the forward movement of the injection unit base 18a to switch the state of the injection unit base 18a to a pivotable state; a pin connecting portion 26, which is provided at a position, at which the pin connecting portion integrated with the injection unit base 18a is deviated from the pivot 24, for connecting the injection unit base to the pivot pin 25 so that the forward movement of the injection unit base 18a is restricted by the pivot pin 25 to be converted into a swiveling motion; a pin supporting portion 28, secured to the frame 15, for supporting the pivot pin 25 so that the pivot pin 25 is slidable in axial directions; and a pin operating portion 30 for causing the pivot pin 25 to be inserted into and extracted from the pin connecting portion 26.

U.S. Pat. No. 7,399,179 (Schultz et al.) discloses (i) a mounting system of an injection unit of an injection molding system, and (ii) an injection molding system having a mounting system of an injection unit, amongst other things. In one example, the mounting system comprises: a fluid distributor and an operational drive; a carriage; a pair of mounts disposed with the fluid distributor and the operational drive to permit slidable adjustment of the carriage; and a third mount disposed with the carriage, the third mount adjustable about a horizontal axis and adjustable about a lateral axis to permit adjustment of a barrel and a machine nozzle being mounted with the barrel.

SUMMARY

The following summary is intended to introduce the reader to various aspects of the applicant's teaching, but not to define any invention. In general, disclosed herein are one or more methods or apparatuses related to supporting injection units on an injection molding machine and providing a swivel connection between an injection unit and an injection molding machine base.

According to one broad aspect, an injection molding machine includes a base, a platen mounted to the base for supporting a mold portion and a linear support fixed to the base. The linear support extends parallel to a longitudinal axis. The injection molding machine also includes a retainer coupled to the linear support. The retainer is translatable relative to the linear support along the longitudinal axis between a retracted position spaced away from the platen, and an advanced position intermediate the platen and the retracted position, the retainer rotationally fixed relative to the linear support (the retainer non-rotatable relative to the linear support). An injection unit is slidably supported on the linear support and coupled to the retainer. The injection unit is pivotable relative to the retainer and the injection unit is translatable with the retainer relative to the linear support. The injection unit includes at least one bearing surface that rests directly upon the linear support, the bearing surface transferring weight of the injection unit to the linear support.

According to another broad aspect, an injection molding machine includes a base for supporting at least one platen and a linear support fixed to the base. The linear support extends parallel to a longitudinal axis. The injection molding machine also includes a retainer slidably and non-rotatably coupled to the linear support. The retainer is translatable relative to the linear support along the longitudinal axis between retracted and advanced positions. An injection unit is pivotably coupled to the retainer and pivotable relative to the retainer and the base. The injection unit is slidably supported by the linear support and the weight of the injection unit is transferred to the linear support without passing through the retainer.

According to another broad aspect, an injection molding machine includes a base, a platen mounted to the base for supporting a mold portion and a linear support fixed to the base. The linear support comprises a pair of spaced apart rails each extending parallel to a longitudinal axis. A retainer is slidably and non-rotatably coupled to the linear support. The retainer is translatable relative to the base along the longitudinal axis between a retracted position spaced away from the platen, and an advanced position intermediate the platen and the retracted position. An injection unit is slidably supported on the linear support and pivotably coupled to the retainer. The injection unit is translatable with the retainer and pivotable relative to the retainer. The retainer is disposed beneath the injection unit and laterally between the rails so that no portion of the retainer is vertically between a downward facing surface of the injection unit and an upward facing surface of the rails.

According to another broad aspect, an injection molding machine includes a base for supporting a platen and a linear support fixed to the base. The linear support includes a pair of spaced apart rails each extending parallel to a longitudinal axis. The injection molding machine also includes an injection unit bearing against and slidably supported by the rails. A retainer is pivotably coupled to an underside of the injection unit. The retainer is generally suspended from the injection unit laterally between the rails. The retainer slidably engages the rails to allow axial translation of the retainer along the longitudinal axis and inhibiting lateral translation perpendicular to the longitudinal axis. The injection unit is translatable with the retainer and pivotable relative to the retainer and the base.

In some examples, the linear support comprises a keeper portion and the retainer includes an upward facing retaining surface that abuts the keeper portion to inhibit upward movement of the injection unit.

In some examples, the injection molding machine also includes an actuator operably connected between the injection unit and the base for selectably translating the injection unit between the advanced and retracted positions.

In some examples, the actuator pivots with the injection unit and is pivotable relative the retainer.

In some examples, the actuator defines an actuator axis that is disposed at an elevation above that of the retainer.

In some examples, the actuator includes a moving portion and a stationary portion coupled to the base. The moving portion may be mounted to the injection unit.

In some examples, the moving portion includes a cylinder housing and the stationary portion includes a piston translatably mounted within the cylinder housing and a piston rod connected to the piston. The cylinder housing may be mounted on a back face of the injection unit and the piston rod may be coupled to the base at a location intermediate the injection unit and the stationary platen.

In some examples, the injection unit further comprises an actuator passage and the piston rod extends through the actuator passage.

In some examples, the injection molding machine includes a swivel member connecting the retainer to the injection unit. The swivel member is pivotable about a pivot axis.

In some examples, the swivel member is pivotable relative to the retainer and fixed relative to the injection unit.

In some examples, the swivel member provides the only translational load bearing connection between the injection unit and the retainer.

In some examples, the swivel member is disposed at an elevation below the actuator axis.

In some examples, the injection unit is pivotable between a first position and a second position and the injection molding machine further includes at least a first alignment member to releasably retain the injection unit in the first position.

In some examples, the linear support has a pair of spaced apart, parallel rails. Each rail has a channeling surface and the retainer has at least one guiding surface that engages each channeling surface to guide the translation of the retainer.

In some examples, the mounting apparatus includes at least one roller coupled to the retainer, and the guiding surface comprises a portion of the roller.

In some examples, the injection unit includes a downward facing bearing surface and the linear support includes an upward facing slide surface to contact the bearing surface.

In some examples, the injection unit includes two spaced apart bearing surface portions and the linear support comprises two spaced apart slide surface portions.

In some examples, the slide surface has a slide surface length extending parallel to the longitudinal axis and a side surface width and the retainer has a retainer length that is less than the slide surface length and a retainer width that is less than the slide surface width.

In some examples, the bearing surface has a bearing surface length and the retainer has a retainer length that is less than the bearing surface length.

In some examples, lateral movement of the retainer is constrained by the linear support.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 5 is a section view of the portion of the machine of FIG. 4 taken along the lines 5-5;

FIG. 5A is an enlarged portion of the structure of FIG. 5;

FIG. 8 is a perspective view of a swivel member of the machine of FIG. 1;

FIG. 9 is a perspective view of an actuator and the swivel member of FIG. 8 and the retainer member of FIG. 6 shown in an assembled condition;

FIG. 10 is a perspective view of a barrel support portion of the machine of FIG. 1;

FIG. 11 is an upper perspective view of another example of a retainer member;

FIG. 12 is a lower perspective view of the retainer member of FIG. 11;

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
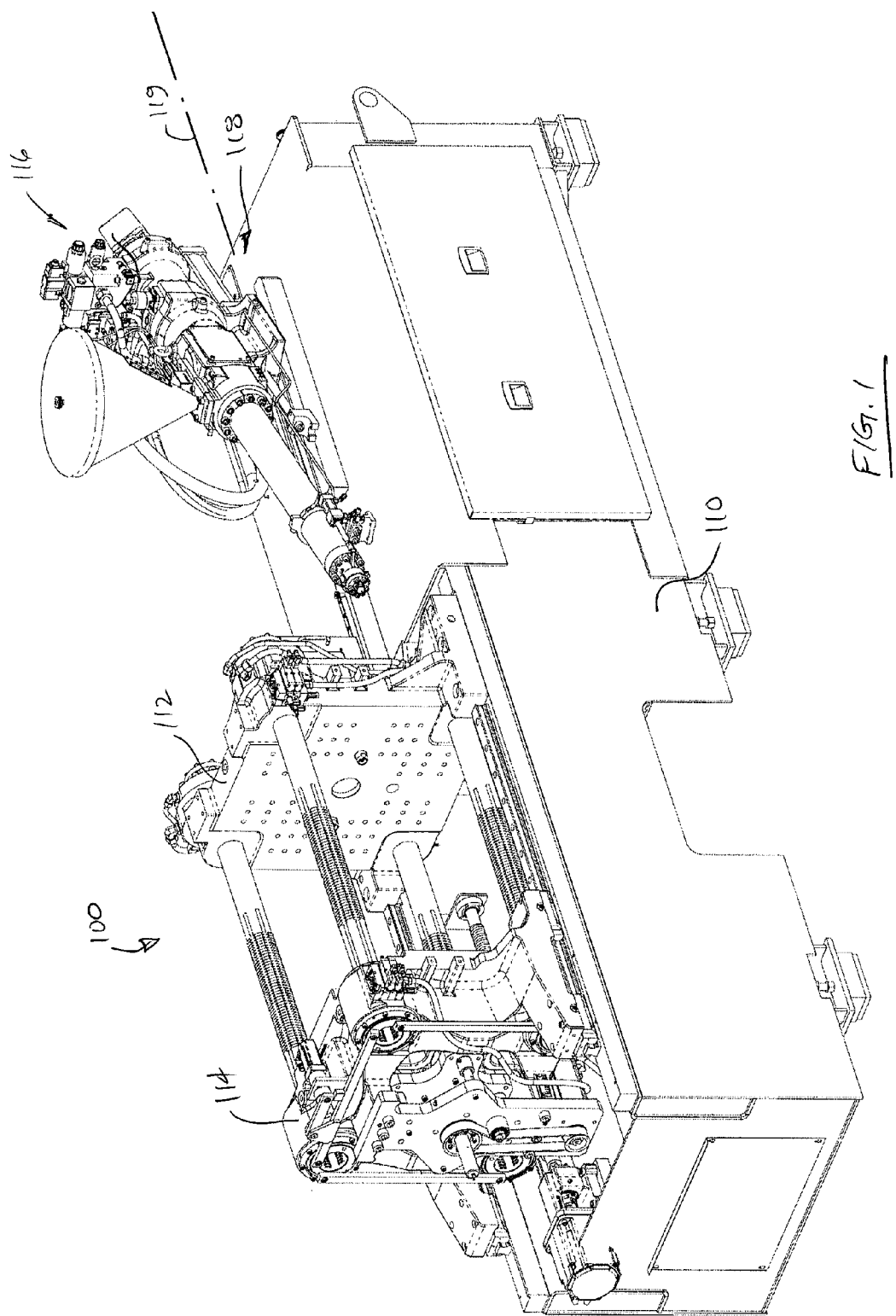
FIG. 1 is a perspective view of an example of an injection molding machine.

Referring to FIG. 1, an example of an injection molding machine 100 comprises a base 110 with a stationary platen 112 and a moving platen 114 mounted to the base 110 to support respective halves of a mold. In the example illustrated, the injection molding machine 100 is of the "two-platen machine" variety. In other examples, the injection molding machine 100 may comprise more than two platens.

The injection molding machine 100 further includes an injection unit 116 and an injection unit mounting apparatus 118 for movably supporting the injection unit 116 on the base 110. The mounting apparatus 118 defines a longitudinal axis 119 along which the injection unit 116 can translate relative to the machine base 110. In the example illustrated, the mounting apparatus 118 also defines a pivot axis 121 (FIG. 4) about which the injection unit 116 can pivot relative to the machine base 110. In the example illustrated, the longitudinal axis 119 is generally horizontal, and the pivot axis 121 is generally vertical.

The injection unit 116 is generally translatable between a retracted position (FIGS. 1 and 2) spaced away from the stationary platen 112, and an advanced position (FIG. 3) disposed towards the stationary platen 112 (i.e. intermediate the stationary platen 112 and the retracted position). In this description, reference to a "front" of the injection unit indicates an end of the injection unit nearest the stationary platen 112, and movement along the axis 119 towards the platen 112 is referred to as movement in a forward direction, with the opposing end and direction theretowards referred to as "rear" and "rearwardly", respectively. The injection unit 116 is generally pivotable between an in-line position (FIG. 3) in which the barrel is parallel to the longitudinal axis 119, and a swing-out or maintenance position (FIGS. 1 and 2) in which the barrel is moved out of alignment with the longitudinal axis 119, and generally swung laterally towards an operator side of the injection molding machine 100.

Figure 2:
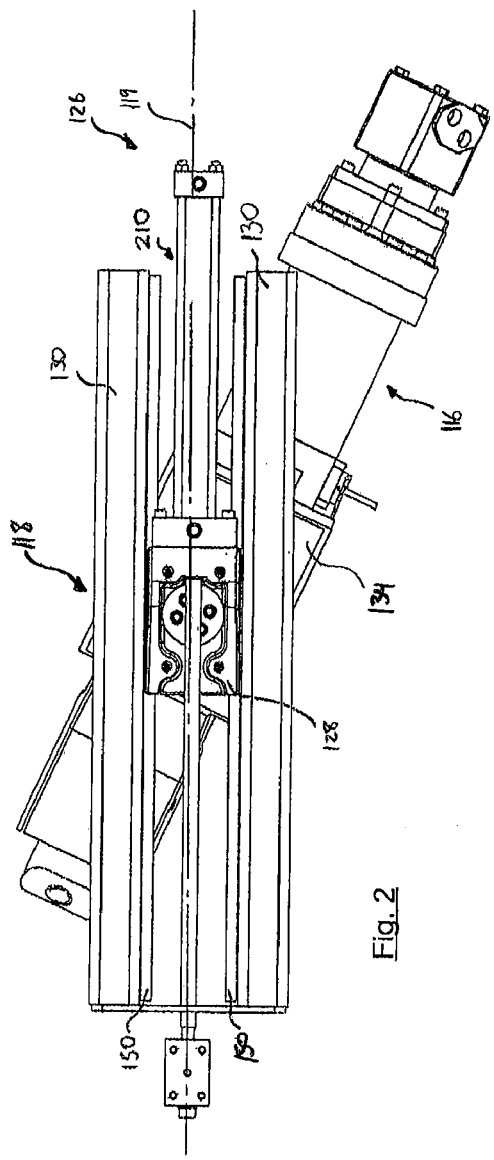
FIG. 2 is bottom plan view of a portion of the machine of FIG. 1, showing an injection unit and a support on which the injection unit can be mounted.
Figure 4:
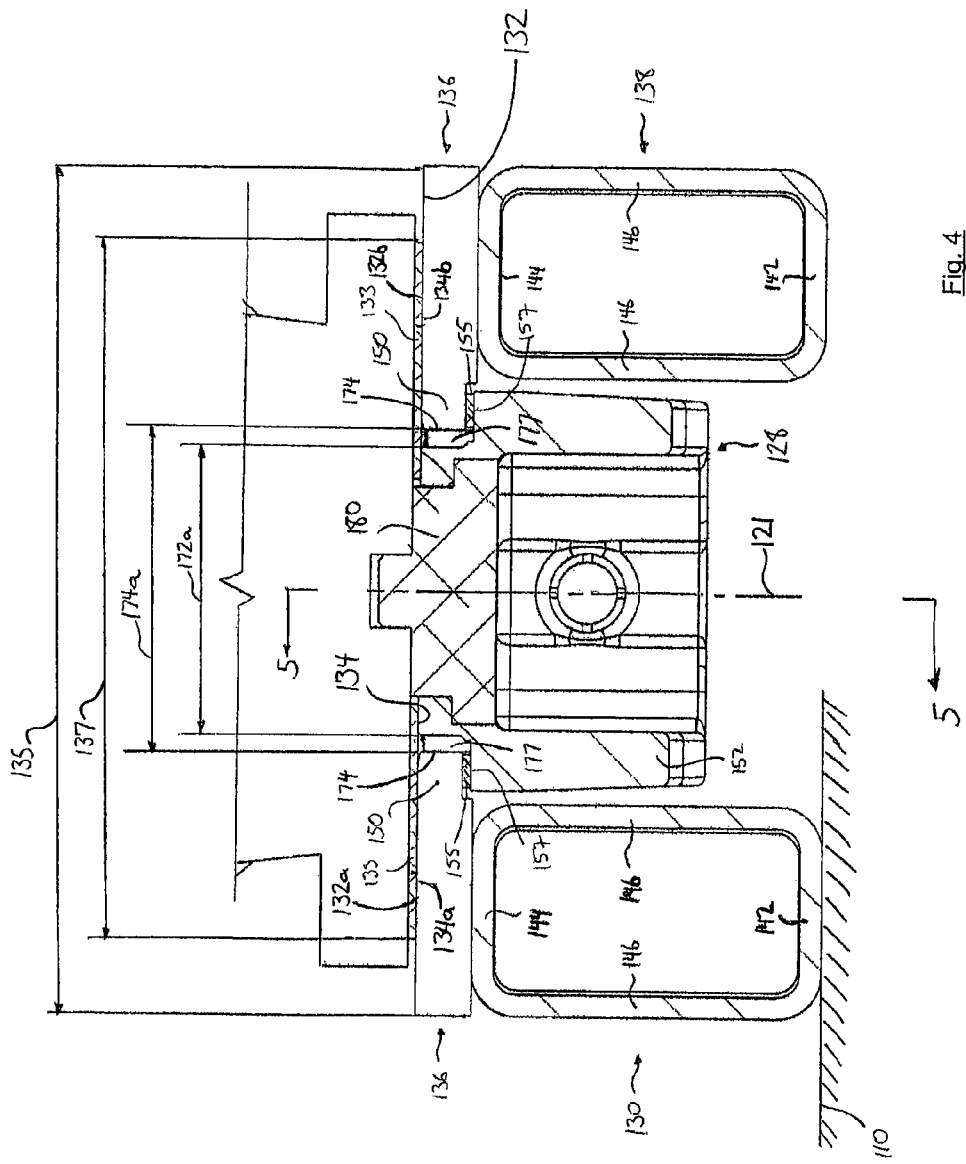
FIG. 4 is a section view of the portion of the machine of FIG. 3, taken along the lines 4-4.

With reference to FIGS. 2 and 4, the mounting apparatus 118 comprises a linear support 126 extending parallel to the longitudinal axis 119, and a carriage-like retainer 128 coupled to the linear support 126 and translatable relative to the base 110 along the longitudinal axis 119. The injection unit 116 is pivotably coupled to the retainer 128 about the pivot axis 121. The injection unit is, in the example illustrated, translatable relative to the base 110 with the retainer 128, and pivotable relative to the retainer 128 about the pivot axis 121. In the example illustrated, the retainer 128 is in some ways structurally and/or functionally similar to what may typically be referred to as a carriage, however, the retainer 128 has some attributes which one skilled in the art may interpret as distinct from a typical carriage. This will become apparent through further description hereinafter.

The linear support 126 can include at least one rail member 130. In the example illustrated, the linear support 126 comprises two parallel spaced apart rail members 130. Each rail member 130 can be spaced equally apart from, and on either side of, the longitudinal axis 119. The linear support 126 can provide an upper slide surface 132 against which an underside surface 134 (also called bearing surface 134) of the injection unit 116 can slidably bear.

The slide surface 132 is, in the example illustrated, a generally smooth, upward facing planar surface, and the bearing surface 134 of the injection unit is a generally planar downward facing surface. In the example illustrated, the slide surface 132 is discontinuous, with each rail member 130 presenting separate and distinct slide surface portions 132a, 132b of the slide surface 132. The slide surface portions 132a, 132b are separated from each other by an intermediate gap. The bearing surface 134 of the injection unit 116 can be a generally planar underside surface of the injection unit, and can comprise an underside surface wear plate or pad 133 affixed to the underside of the injection unit. In the example illustrated, the bearing surface 134 is discontinuous across its planar extent, with at least a generally central opening having first and second bearing surface portions 134a, 134b on either lateral side thereof. The interface between the slide surface 132 and the bearing surface 134 can be greased, lubricated, and/or treated to reduce the friction between the surfaces 132, 134. The slide surface 132 has a first lateral extent 135 that may be approximately equal to, or in some examples slightly greater than, a second lateral extent 137 of the underside bearing surface 134 of the injection unit 116. This can help the linear support 126 to bear the weight of the injection unit 116 in a secure, balanced manner when the injection unit 116 is in the in-line position (aligned parallel to the longitudinal axis 119) and when pivoted to the maintenance position out of alignment with the longitudinal axis 119.

With reference to FIG. 4, the slide surface 132 can comprise an upper surface of a top plate 136 that can be supported above the base 110 by a riser 138. Additionally or alternatively, top (upper surface) wear plates can be secured to an upper portion of the top plates 136 to provide the slide surface 132. In the example illustrated, risers 138 having a generally tubular shape in cross section are provided. Each riser 138 has a bottom wall 142 connected to the base 110 of the injection molding machine 100 and an opposing upper wall 144 that supports the top plate 136. The bottom wall 142 and upper wall 144 of each riser 138 can be joined by a pair of spaced apart, opposing sidewalls 146 so that the risers 138 form a hollow, tube-like member having a generally rectangular cross section. The corners of the risers 138 may be rounded or radiused, as shown, or may comprise sharp corners or chamfered corners in other examples. In other examples risers 138 may be solid or the bottom wall 142 and upper wall 144 may be connected by a single web so that the risers 138 have an I-beam configuration (i.e. having a generally I-shaped cross section).

Each riser 138 may be connected to the base 110 by, for example, suitable welding, bolts, screws, etc. Similarly, the top plate 136 can be connected to the riser 138 by welding, bolts, screws, etc. In some examples, the slide surface 132 can comprise a surface of the riser 138, without providing a separate top plate. In some examples, the top plate and riser can be integrally formed of unitary, one-piece construction. In some examples, the risers and/or the top plates may be at least partially formed integrally with the machine base 110.

The linear support 126 can comprise a keeper 150 that engages the retainer 128 when the retainer 128 translates along the linear support 126. The keeper 150 can help to inhibit the injection unit 116 from tipping in a vertical direction, for example by inhibiting the retainer 128 (secured to the injection unit 116) from moving in a direction away from the base 110. The retainer 128 can comprise a body 152 extending lengthwise along the longitudinal axis 119, the body 152 having at least one retaining surface 154 disposed vertically between the base 110 and the keeper 150. In the example illustrated, two keepers 150 are provided, each keeper 150 comprising a laterally inwardly protruding portion of the top plate 136 of each rail 130 and beneath which at least a portion of the retainer 128 is positioned. In the example illustrated, the retainer body 152 has a shoulder 156 extending lengthwise along each upper, laterally outer corner, the shoulder 156 providing a retaining surface 154 (FIG. 6) that is directed upwardly towards the injection unit 116, and engages an underside surface 157 of the keeper 150. Lubrication can be provided between the retaining surface 154 and the underside surface 157 of the keeper 150. Additionally or alternatively, a bottom wear strip 155 can be mounted to one or both of the retainer 128 and top plate 136 to provide low friction and/or replaceable surfaces 154, 157.

Further details of the illustrated example of the retainer body 152 can be described with reference to FIGS. 6 and 7. The retainer body 152 can have the form of a generally hollow member having a pair of spaced apart, generally vertical retainer sidewalls 164, a top wall 166 extending in a generally horizontal plane between upper edges of the side walls 164, an end wall 168 extending in a generally vertical plane between back edges of the side walls, and a generally open bottom. The sidewalls 164, top wall 166 and end wall 168 can cooperate to define a retainer interior volume.

As mentioned previously, shoulders 156 are provided at the intersection between the top wall 166 and each carriage sidewall 164. In the illustrated example, each shoulder 156 provides a generally horizontal retaining surface 154 for engaging the keepers 150 of the linear supports 126. The retainer can further include a guiding surface for inhibiting horizontal movement of the retainer in a direction normal to the longitudinal axis 119. In some examples, each shoulder 156 can include an upstanding shoulder wall 172 that extends upwardly from a laterally inner edge of each retaining surface 154. The guiding surface can include all or a portion of the shoulder walls 172. The shoulder walls 172 on either side of the retainer 128 can be laterally spaced apart by a first spacing 172a (FIGS. 4 and 6) providing a snug but sliding fit between opposed channeling surfaces or edges 174 provided along each rail member 130, which can be spaced apart by a second spacing 174a (FIG. 4). In the example illustrated, the channeling edges 174 are provided by laterally innermost edges of each top plate 136.

Alternatively or additionally, in some examples the guiding surface can comprise an outer surface of a roller member 177 attached to the retainer 128. In the illustrated example, the roller members 177 are configured to rotate about a generally vertical axis, and the outer surface of each roller member 177 provides a guiding surface that contacts the channeling edge 174 as the retainer 128 translates. The sliding contact (which can include rolling contact) between the rollers 177 and the channeling edges 174 can reduce the frictional forces created between the retainer 128 and the channeling edges 174 when the retainer 128 translates. Reducing the frictional forces may inhibit wear and may reduce the power required to translate the retainer 128. In other examples, the guiding surface can comprise, pads, bosses, skis and other surfaces configured to slidingly engage the channel edges 174. The guiding surfaces can be greased, oiled or otherwise lubricated to facilitate providing a sliding contact with the channeling edges 174. The guiding surfaces can be integral the carriage body 152, provided as separate members or any combination thereof.

In the example illustrated, each roller 177 is rotatably mounted to the retainer body 152 within a respective, complimentary seat 178. In the present example, the outer surfaces of the rollers 177 extend laterally inwardly of the shoulder walls 172 (with laterally outermost surfaces of the rollers extending laterally outwardly of the shoulder walls), with a gap 179 provided between the shoulder walls 172 and the channeling edges 174 (FIGS. 4 and 9). In other words, the vertical axis about which the roller 177 rotates is spaced laterally inwardly from the corresponding shoulder wall 172 by an amount less than the radius of the roller 177. In this example, the shoulder walls 172 can be spaced apart from (laterally inwardly of) the channeling edges 174. In other examples, the outer surfaces of the rollers 177 may be substantially flush with the shoulder walls 172 so that both the rollers 177 and the shoulder walls 172 can contact the channeling edges 174 and provide guiding surfaces.

Figure 7:
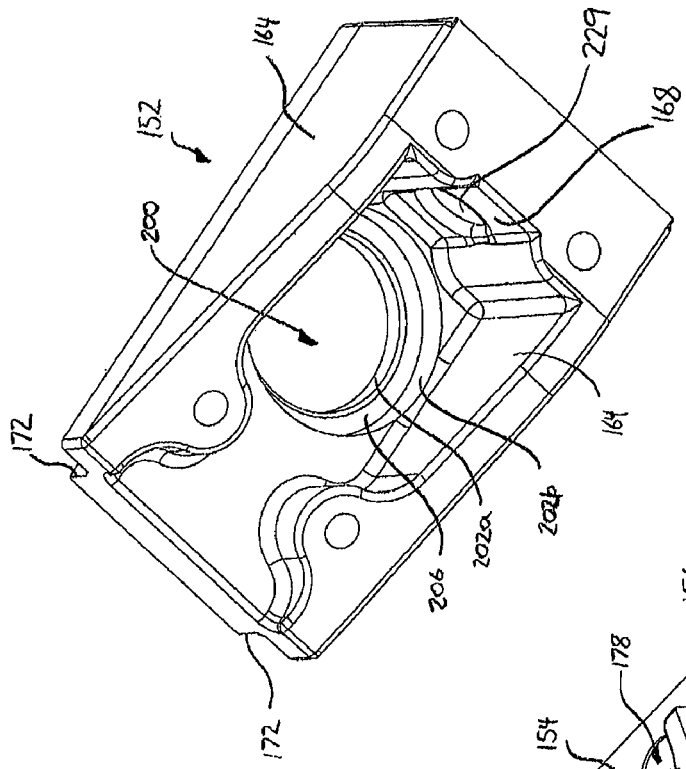
FIG. 7 is a lower perspective view of the retainer member of FIG. 6.
Figure 6:
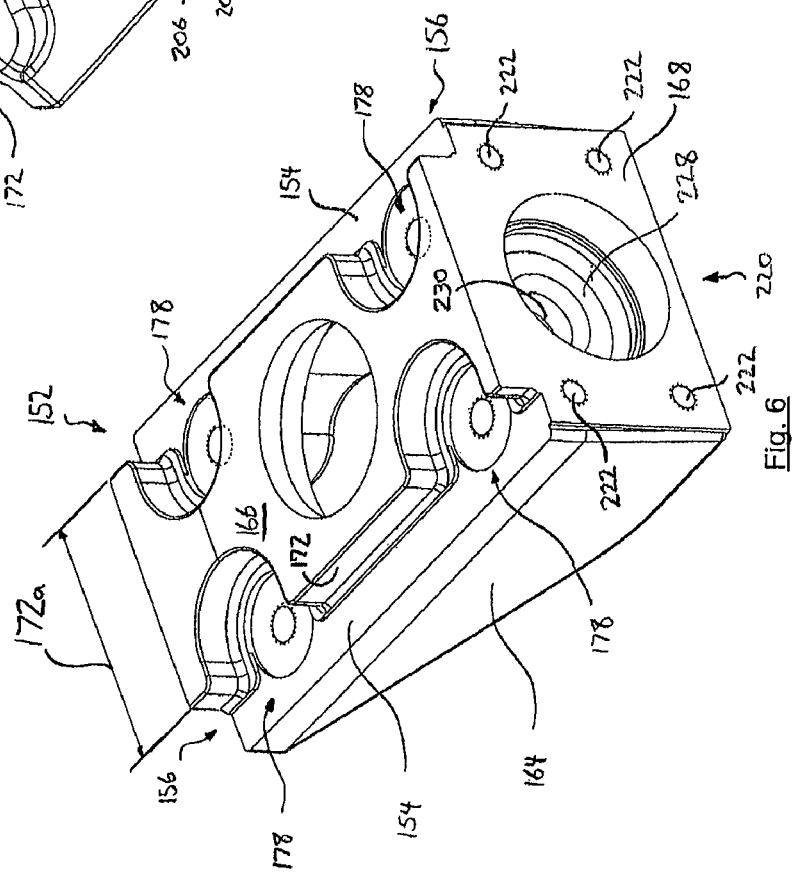
FIG. 6 is an upper perspective view of a retainer member of the machine of FIG. 1.

Referring to FIGS. 6, 7 and 9, one example of the retainer 128 includes four seats 178 for receiving four rollers 177, two on each side of the retainer body 152. Providing four rollers 177 can provide two points of contact between the retainer 128 and each channel edge 174 at longitudinally spaced apart locations, which may help resist twisting and maintain alignment of the retainer 128 during use. In other examples, the retainer 128 can include a different number of rollers 177, other suitable guiding surfaces or any combination thereof (for example two rollers 177 and two sliding pads).

In some examples, the guiding surfaces (i.e. walls 172, rollers 177) are configured to provide primarily lateral support and/or guidance for the retainer 128 and do not serve to restrain the retainer 128 in a vertical direction. In other examples, the roller members can be configured to provide both lateral and vertical support. In some examples, roller elements can be provided along the rails 130, and the channeling edges 174 can comprise all or a portion of outer surfaces of the roller elements.

The retainer body 152 may be made from a suitable material having desired mechanical properties, including metal and plastic. The thickness of any retainer walls or surfaces may be selected based on the material of the retainer 128 in order to provide the desired mechanical properties (i.e. a plastic retainer may have thicker walls than a metal retainer to achieve the same desired mechanical properties). In the example illustrated, the retainer body 152 is made of cast iron.

Referring again to FIG. 4, to pivotably mount the injection unit 116 to the retainer 128, the injection molding machine 100 can further include a swivel member 180 connecting the retainer 128 to the injection unit 116, the swivel member 180 pivotable about the pivot axis 121. The swivel member 180 can be pivotable relative to the retainer 128, and fixed relative to the injection unit 116.

With reference also to FIG. 8, in the example illustrated, the swivel member 180 comprises an outer side surface 182 extending lengthwise of the pivot axis 121, at least a portion of the outer side surface 182 defining a journal surface coaxial with the pivot axis 121 and in engagement with a coaxial bearing surface fixed to the retainer 128 for pivotably retaining the swivel member 180 to the retainer 128. The swivel member 180 can further comprise a flange element extending radially outwardly of the side surface, the retainer 128 comprising an abutment surface in engagement with the flange element for inhibiting movement of the swivel member 180 relative to the retainer 128 in a direction parallel to the pivot axis 121.

In the example illustrated, the swivel member 180 has a stepped cylindrical shape, such that the outer side surface 182 has an upper cylindrical portion 182a having a first diameter 184 and a lower cylindrical portion 182b having a second diameter 186. The first (upper) diameter 184 is, in the example illustrated, smaller than the second (lower) diameter. Both the upper and lower cylindrical portions 182a, 182b are coaxial with the pivot axis 121. The flange element can comprise at least a portion of the lower cylindrical portion 182b, and can include an upwardly directed flange surface 187. The swivel member 180 further includes an upper end face 188 that can be generally orthogonal to the pivot axis 121 and bounded by the upper cylindrical portion 182a. The upper end face 188 can be configured for mounting to a laterally central portion of the underside bearing surface 134 of the injection unit 116. In the example illustrated, at least an uppermost portion of the upper cylindrical portion 182a passes through the generally central opening of the wear pad 133, and the upper end face 188 is attached directly to an underside surface of the injection unit 116. The profile of the upper end face 188 can be any shape that is complimentary to the profile of the underside surface (and/or bearing surface 134) of the injection unit 116. For example, if the underside surface includes a generally concave portion, the upper end face 188 can have a complimentary, generally convex portion that can nest within the concave portion of the underside surface.

In the example illustrated, the upper end face 188 includes at least one bolt hole 190 for receiving a fastener securing the swivel member 180 to the injection unit 116. The upper end face 188 can further include a locating pin 192 extending upwardly from the end face 188 for engagement with a corresponding bore in the underside of the injection unit.

With reference again to FIG. 7, the retainer 128 can be provided with a swivel seat 200 for pivotably retaining the swivel member 180 to the retainer. In the example illustrated, the swivel seat 200 comprises a seat bore 202 in the retainer body. The seat bore is stepped or counter-bored so that it has an upper bore portion 202*a* and a lower bore portion 202*b*, respectively receiving the upper and lower portions 182*a*, 182*b* of the swivel member 180. At least a portion of one of the upper and lower cylindrical portions 182*a*, 182*b* can engage at least a portion of the upper and lower bore portions 202*a*, 202*b* in sliding fit as the swivel member pivots within the seat, so that the aforementioned portion of the upper and lower cylindrical portions 182*a*, 182 provides a journal surface, and the aforementioned portion of the upper and lower bore portion 202*a*, 202*b* provides a corresponding rotary bearing surface.

With reference also to FIG. 9, the upper bore portion 202*a* of the seat bore 202 can extend through the top wall 166 of the retainer body 152, and the end face 188 of the swivel member 180 can be exposed to the underside of the injection unit through the bore 202. The bore 202 has a generally annular abutment surface 206 (FIG. 7) extending radially between the difference in diameter between the upper and lower bore portions 202*a*, 202*b*. The abutment surface 206 is directed generally downwardly, away from the injection unit, and engages the upwardly directed flange surface 187 to inhibit vertical displacement of the swivel member 180 away from the top wall 166 of the retainer body 152, and hence away from the base 110 when in use. When the injection unit 116 is fastened to the swivel member 180 and the swivel member 180 is mounted in the swivel seat 200 (with the retainer 128 coupled to the linear support 126 when in use), generally all relative motion between the retainer 128 and the injection unit 116, other than pivoting about the pivot axis 121, is inhibited.

In the example illustrated, to facilitate unrestricted pivoting of the injection unit 116 relative to the base 110, the upper surface of the top wall 166 of the retainer body 152 is vertically disposed at or below the elevation of the slide surface 132 of the rails 130. The can help to avoid interference of laterally outer portions of the underside bearing surface 134 of the injection unit 116 with the retainer 128 when pivoting from the in-line position to the swing-out position.

Referring to FIGS. 2 and 9, a retainer actuator 210 can be provided for selectively translating the retainer 128 (and injection unit attached thereto) in either direction along the linear support 126. In the example illustrated, the actuator 210 is operably connected between the retainer 128 and the machine base 110. In some examples according to the teaching disclosed herein, the injection unit 116 can be pivoted relative to the retainer 128 when the actuator 210 is in the operably connected condition (i.e. operably connected between the base and the retainer). This can advantageously eliminate the need for disconnecting the actuator 210 (or at least one end of the actuator) before pivoting the injection unit 116 from the in-line position to the maintenance position.

The actuator 210 can comprise a stationary portion 212 and a moving portion 214 engaged with the stationary portion 212, with a source of energy interacting with at least one of the portions for urging translation of one portion relative to the other. The stationary portion 212 can be fixed relative to the base 110, and the moving portion 214 can be connected to the retainer 128 and can translate relative to the base 110 with the retainer 128.

With reference to FIGS. 5 and 5A, in the example illustrated, the actuator 210 comprises a fluid cylinder 210*a* having a piston 212*a* displaceable within a cylinder housing 214*a* in response to pressurizing one of two chambers on either side of the piston 212*a*. The cylinder housing 214*a* is, in the example illustrated, fixed to the retainer 128, and the piston 212*a* (with piston rod 212*b* extending therefrom) is fixed to the base 110 by attachment to an anchoring block 218. Accordingly, in the example illustrated, the stationary portion 212 of the actuator 210 corresponds to the piston and rod 212*a*, 212*b*, and the moving portion 214 corresponds to the cylinder housing 214*a*.

Figure 3:
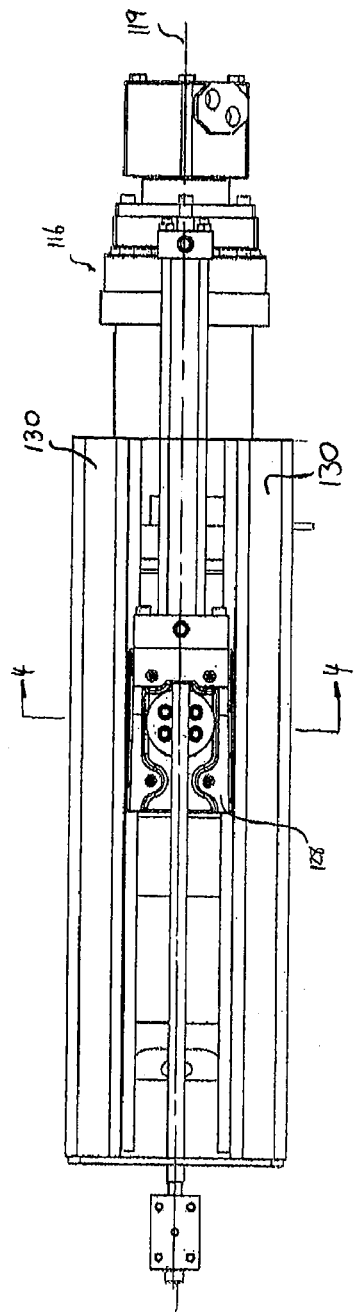
FIG. 3 is a bottom plan view of the portion of the machine of FIG. 2, showing the injection unit in an alternate position.

With reference to FIGS. 2 and 3, the retainer actuator 210 can be located proximate the linear support 126 in a way that makes efficient use of space. In the example illustrated, the actuator 210 is generally mounted laterally between the two rail members 130, and vertically between the base 110 and the injection unit 116. The actuator 210 can be positioned substantially at the lateral midpoint between the two rail members 130 (i.e. co-linear with the longitudinal axis 119). The centrally aligned position of the actuator 210 can help to avoid generating a moment load on the retainer 128 or rails 130 when translating the injection unit 116 between the advanced and retracted positions. This can help to reduce twisting or misalignment of the retainer 128 when in use. In other examples, the retainer actuator 210 may be laterally offset from the longitudinal axis 119. In addition, or alternatively, in some examples the retainer actuator 210 may comprise more than one actuator, for example a pair of spaced apart, parallel fluid cylinders. In some examples, the selected fluid cylinder may be a hydraulic or pneumatic cylinder. In some examples, the retainer actuator may comprise an electric actuator, a servo-driven ball-screw, or a rack-and-pinion actuating system.

With reference to FIGS. 6 and 9, details of the connection between the actuator 210 and the retainer 128 can be described. The retainer 128 comprises a moving portion mount 220 for connecting the moving portion 214 of the actuator 210 to the retainer 128. In the example illustrated, the moving portion mount 220 comprises a plurality of fastener holes 222 provided in the end wall 168 of the retainer body 152. A front end of the cylinder housing 214*a* can be mounted to the end wall 168 of the retainer 128 by inserting fasteners 226 through the cylinder housing and into the fastener holes. The moving portion mount 220 can further include a cylinder seat 228 in the end wall 168 for receiving a nose portion of the cylinder housing. A rod aperture 229 can extend through the end wall 168 to receive the piston rod 212*b* therethrough. In the example illustrated, the piston rod 212*b* extends from the cylinder housing 214*a* towards the stationary platen 112, and passes vertically underneath the swivel member 180 (FIG. 5A).

The end of the piston rod 212*b* opposite the piston 212*a* can be secured to the anchoring block 218. The anchoring block 218 can be fixed to the base 110 using any suitable means including bolts and rivets, so that the anchor 218 does not move relative to the base 110. The anchoring block 218 can provide a stable, fixed connection point that can provide the necessary reaction force to balance the force exerted by the retainer actuator 210. The anchoring block 218 may be connected directly to the base 110, or it may be connected to the base 110 using one or more intermediate elements, including mounting plates, spacers, or other elements fixed to the machine base 110.

In the present example, the actuator 210 is packaged such that the cylinder housing 214a generally remains within the longitudinal extent of the rails 130 regardless of the position of the retainer between the advanced and retracted positions. Keeping the actuator 210 from extending rearward of the rails 130 (i.e. beyond the rails in a direction away from the stationary platen 112) can help to shorten the overall length required by the machine.

With reference to FIG. 10, the injection molding machine 100 can further include a releasable alignment member 230 for holding the injection unit 116 in the in-line position during operation of the machine. The alignment member can be mounted forward of the injection unit, and/or proximate the swivel axis of the injection unit, and/or rearward of the injection unit. In the example illustrated, the alignment member 230 comprises a barrel support arm 232 extending downwardly from a front portion of a barrel 234. The barrel 234 extends horizontally from the injection unit 116 towards the stationary platen 112 when the injection unit 116 is pivoted to the in-line position (see also FIG. 1, shown in the swing-out position).

In the example illustrated, the barrel support arm 232 is slidably supported above the base 110 by attachment to a shoe 236 that is slidably mounted to a barrel support rail 238. The barrel support rail 238 can be mounted to a forward portion of an alignment block 240 extending parallel to the longitudinal axis 119, and the alignment block 240 can be mounted to the base 110. The anchoring block 218 is, in the example illustrated, mounted to a rear portion of the alignment block 240. This mounting configuration can help to simplify accurate installation and aligned operation of the barrel 234 with the support rail 238 and the piston rod 212b of the retainer actuator 210. To pivot the injection unit 116 from the in-line position to the swing-out position, at least a portion of the support arm 232 can be disconnected either from the barrel 234 or the shoe 236. Alternatively, or in addition, the shoe 236 can be disconnected from the support rail 238.

In some examples, the injection molding machine 100 can include more than one alignment member (for example first and second alignment members). In such examples, the first alignment member, for example the alignment member 230, can releasably retain the injection unit 116 in the in-line position. The second alignment member can be configured to position and/or retain the injection unit 116 in a second position, for example the maintenance position.

Optionally, the second alignment member can comprise a stop member that prevents the injection unit 116 from rotating past a pre-determined maintenance position. When configured as a stop member, the second alignment member may prevent over-rotation of the injection unit 116 past the maintenance position but may not be configured to positively retain the injection unit 116 in the maintenance position. Examples of such a second alignment member include pins, abutment surfaces and blocks.

Alternatively, or in addition, the second alignment member can comprise a retaining member to selectably retain the injection unit 116 in the maintenance position, or any other position intermediate the in-line and maintenance positions, which may inhibit unwanted or unintended rotation of the injection unit 116 during machine maintenance or other operations. Examples of such second alignment members include detents, latches, clips and tethers. In some examples, the second alignment member can be configured to function as both a stop member and a retaining member. For example, the second alignment member may include an abutment surface for preventing over-rotation of the injection unit 116 and a selectably engageable latch that can optionally be engaged to retain the injection unit 116 against the abutment surface.

In use, the injection molding machine 100 moves to a mold-closed position by translating the moving platen 114 towards the stationary platen 112, and clamping the platens 112, 114 together. The barrel 234 can then be translated (through force exerted by the actuator 210) to the advanced position, so that the barrel nozzle 244 (FIG. 10) engages and is held against a sprue bushing in the stationary platen 112. The injection unit 116 can then be activated to urge liquefied injection compound from the barrel 234 into the mold. After the injection stroke, the injection unit 116 can be translated away from the stationary platen 112 and towards the retracted position, for example, to avoid excessive heat transfer from the heated barrel 234 to the stationary platen 112.

After a period of use it may be desirable to gain access, for example, to parts of the injection unit 116 or the barrel 234. The injection unit 116 can be translated towards the retracted position, and the alignment member 230 can be moved to a released position, for example, by disconnecting the barrel support arm 232 from the shoe 236. The injection unit 116 can then be pivoted to the maintenance position, for example by manually urging the front end of the barrel 234 towards the operator side of the machine.

The actuator 210 can remain operably connected to the base 110 and the retainer 128 when pivoting the injection unit 116 relative to the base 110. The injection unit 116 can be pivoted when the retainer 128 has been translated to generally any position along the linear support 126, provided the nozzle 244 is clear of the sprue bushing and platen. This condition is generally satisfied when the injection unit 116 is translated away from the advanced, sprue-engaging position by at least 50 percent of the total linear stoke length between the advanced and retracted positions, or in some examples by 10 percent or more of the total linear stroke length between the advanced and retracted positions. In the illustrated example, the injection unit 116 can also be translated between the advanced and retracted positions while oriented in a position at or towards the swing-out position. This can provide additional convenience when requiring access to parts of the injection unit 116 or barrel 234.

Referring to FIGS. 11 and 12, another example of a retainer 328 is illustrated. The retainer 328 has similarities to the retainer 128, and like features are identified by like reference characters, incremented by 200.

The retainer 328 can comprise a body 352 that extends lengthwise along the longitudinal axis 119. Like retainer body 152, the retainer body 352 can have the form of a generally hollow member having a pair of spaced apart, generally vertical retainer sidewalls 364, a top wall 366 extending in a generally horizontal plane between upper edges of the side walls 364, an end wall 368 extending in a generally vertical plane between back edges of the side walls 364, and a generally open bottom. The sidewalls 364, top wall 366 and end wall 368 can cooperate to define a retainer interior volume.

In the example illustrated, the body 352 has two shoulders 356, provided at the intersection between the top wall 366 and each retainer sidewall 364. Each shoulder provides an upward facing retaining surface 354, disposed vertically between the base 110 and the keepers 150. The retaining surfaces 354 can be configured to abut the keepers 150 to inhibit the retainer 328 from moving away from the base 110.

Each shoulder 356 can further provide an upstanding guiding surface 372, extending upwardly from a laterally inner edge of each retaining surface 354. The guiding surfaces 372 can be laterally spaced apart, enabling a sliding fit between the opposed channel edges 174 (FIG. 4).

The example of the retainer body 352 includes two, opposing recesses 378 configured to receive corresponding guidance members, for example rollers 177. In this example, having only two rollers 177, the retainer 328 may slightly twist or pivot (relative to the longitudinal axis 119) during use, which may cause at least a portion of the guiding surfaces 372 to contact the channel edges 174. In such instances, the guiding members of the retainer 328 may include both the rollers 177 and the guiding surfaces 372. In other examples, the retainer 328 can include other suitable guidance members, as described above.

Like retainer body 152, retainer body 352 can be made from any suitable material having the desired mechanical properties, including, for example metal and plastic.

In the example illustrated in FIGS. 11 and 12, the retainer 328 is configured to receive the swivel member 180 in the same manner described above with reference to retainer 128. For example, the retainer 328 can be provided with a swivel seat 400 for pivotably retaining the swivel member 180 in relation to the retainer 328. In the example illustrated, the swivel seat 400 comprises a seat bore 402 in the retainer body 352. The seat bore 402 is stepped or counter-bored so that it has an upper bore portion 402a and a lower bore portion 402b, respectively receiving the upper and lower cylindrical portions 182a, 182b of the swivel member 180. At least a portion of one of the upper and lower cylindrical portions 182a, 182b can engage at least a portion of the upper and lower bore portions 402a, 402b in sliding fit as the swivel member pivots within the seat, so that the aforementioned portion of the upper and lower cylindrical portions 182a, 182 provides a journal surface, and the aforementioned portion of the upper and lower bore portion 402a, 402b provides a corresponding bearing surface.

The upper bore portion 402a of the seat bore 402 can extend through the top wall 366 of the retainer body 352, and the end face 388 of the swivel member can be exposed to the underside of the injection unit 116 through the bore 402. The bore 402 has a generally annular abutment surface 406 (FIG. 12) extending radially between the difference in diameter between the upper and lower bore portions 402a, 402b. The abutment surface 406 is directed generally downwardly, away from the injection unit 116, and engages the upwardly directed flange surface 187 to inhibit vertical displacement of the swivel member 180 away from the base 110. When the injection unit 116 is fastened to the swivel member 180 and the swivel member 180 is mounted in the swivel seat 400, generally all relative motion between the retainer 328 and the injection unit 116, other than pivoting about the pivot axis, is inhibited.

The retainer 328 can be configured to operate in conjunction with the retainer actuator 210, described above. To facilitate use with the retainer actuator 210, the retainer 328 comprises a moving portion mount 420 for connecting the moving portion 214 of the actuator 210 to the retainer 328. Referring still to FIGS. 11 and 12, the moving portion mount 420 comprises a plurality of fastener holes 422 provided in the end wall 368 of the retainer body 352. A front end of the cylinder housing 214a can be mounted to the end wall 368 of the retainer 328 by inserting fasteners through the cylinder housing and into the fastener holes 422.

The moving portion mount 420 can further include a cylinder seat 428 in the end wall 368 for receiving a nose portion of the cylinder housing. A rod aperture 429 can extend through the end wall 368 to receive the piston rod 212b therethrough (as illustrated with reference to retainer 128 in FIG. 5A).

In other examples, the retainer 328 can be configured to operate using any other suitable swivel member or pivotable connector.

With reference to FIGS. 13-17, another example of an injection molding machine 500 includes an injection unit mounting apparatus 518 for movably supporting an injection unit 516 on a base 510. The machine 500 has similarities to the machine 100, and like features are identified by like reference characters, incremented by 400. The mounting apparatus 518 includes a linear support 526 and, in the example illustrated, the linear support 526 includes two parallel spaced apart rails 530. A retainer 528 is disposed beneath the injection unit 516, between the rails 530. For clarity of illustration, in FIG. 13 one of the rails 530 (nearest the operator side of the machine) has been removed to allow a clearer view of the retainer 518 and bearing surface 534.

In the example illustrated, the slide surface 532 includes two separate slide surface portions 532a and 532b (FIG. 17) that are provided by a top or upward facing surface of each respective rail 530. In the example illustrated, each rail 530 is generally formed from a single, solid length of bar stock. In some examples, the rail member may comprise multiple structural members including, for example, a hollow member (like riser 138 described above), a C-channel, an I-beam or any other suitable member. The slide surface portions 532a, 532b may in some examples comprise a top plate and/or top wear plate affixed to the rails 530.

The slide surfaces 532a,b are configured to slidably contact and support the downward facing bearing surface 534 of the injection unit 516. In the example illustrated, substantially all of the weight of the injection unit 516 is transferred directly to the linear support 526, without passing through the retainer 528. This can provide some advantages, for example, but not limited to, facilitating reducing the size of the retainer, such that, for example, the retainer has smaller length and width dimensions than the bearing surface 534 of the injection unit which it supports.

Figure 15:
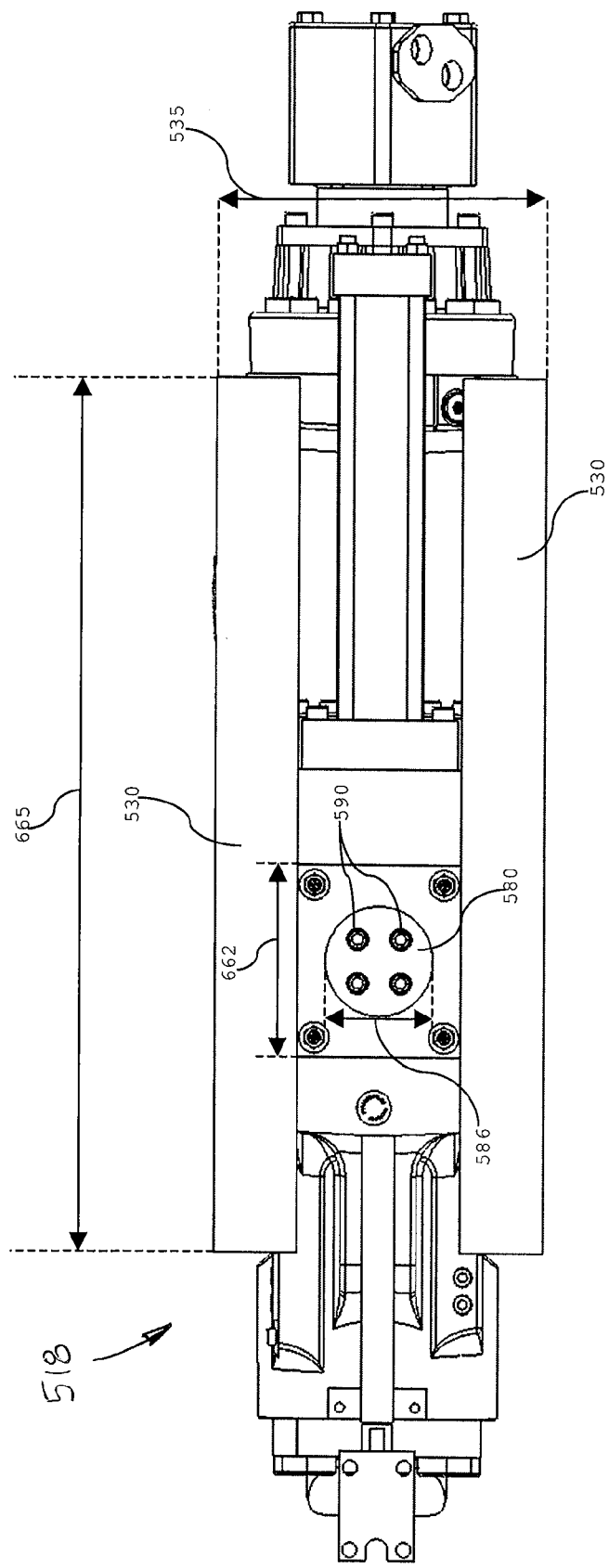
FIG. 15 is bottom plan view showing the injection unit of FIG. 13 and support on which the injection unit can be mounted.

In the example illustrated, the retainer 528 has a retainer width 660 (FIG. 17) that is less than the slide surface width 535 and bearing surface width 537, and a retainer length 662 (FIG. 15) that is less than the bearing surface length 664 (FIG. 16) and the slide surface length 665 (FIG. 15). The retainer width 660 is also, in the example illustrated, less than the slide surface width 535 of the slide surface 532.

Figure 16:
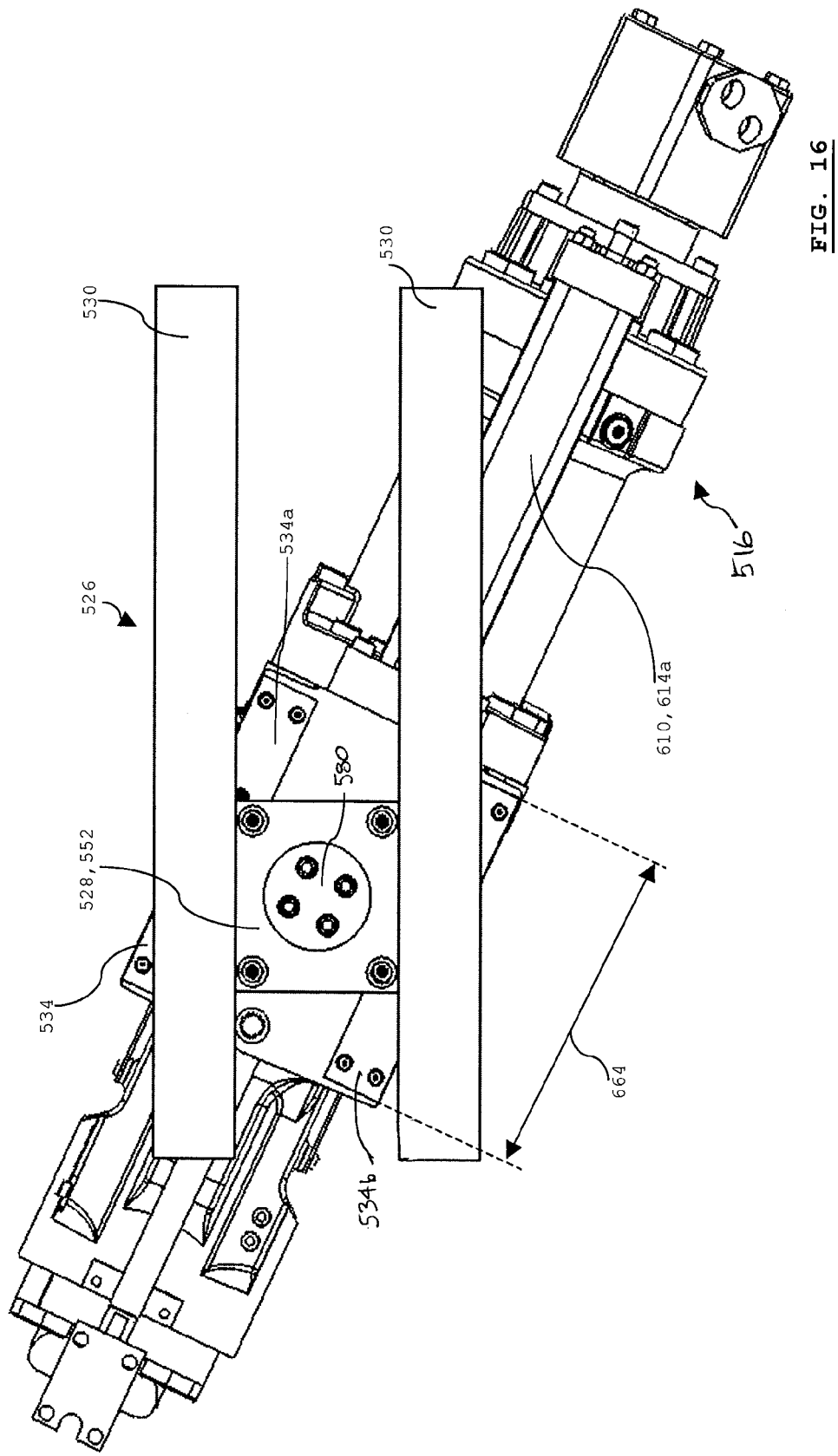
FIG. 16 is a bottom plan view of the injection unit and support of FIG. 15, showing the injection unit in an alternate position.

In some examples the retainer length 662 is less than 50% of the slide surface length 665 and optionally is less than 25% of the slide surface length 665. Optionally, the slide surface 532 need not extend the entire length of the rails 530, and in such instances the slide surface length 665 may be less than the length of the rails 530. In some examples, the retainer length 662 is less than the bearing surface length 664 of the bearing surfaces 534 on the injection unit 516 (FIG. 16).

Figure 13:
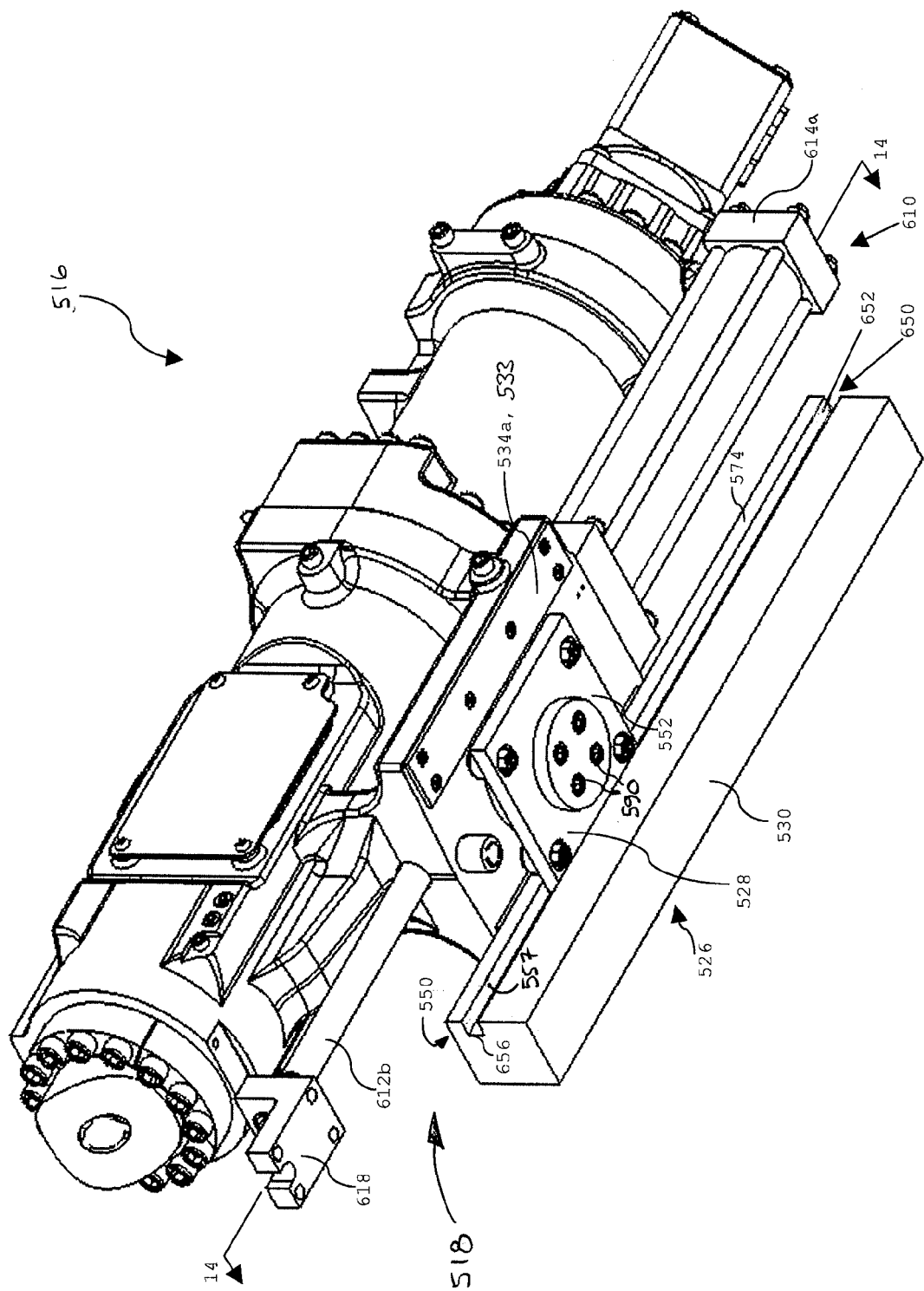
FIG. 13 is a lower perspective view of another example of an injection unit and a support on which the injection unit can be mounted.
Figure 14:
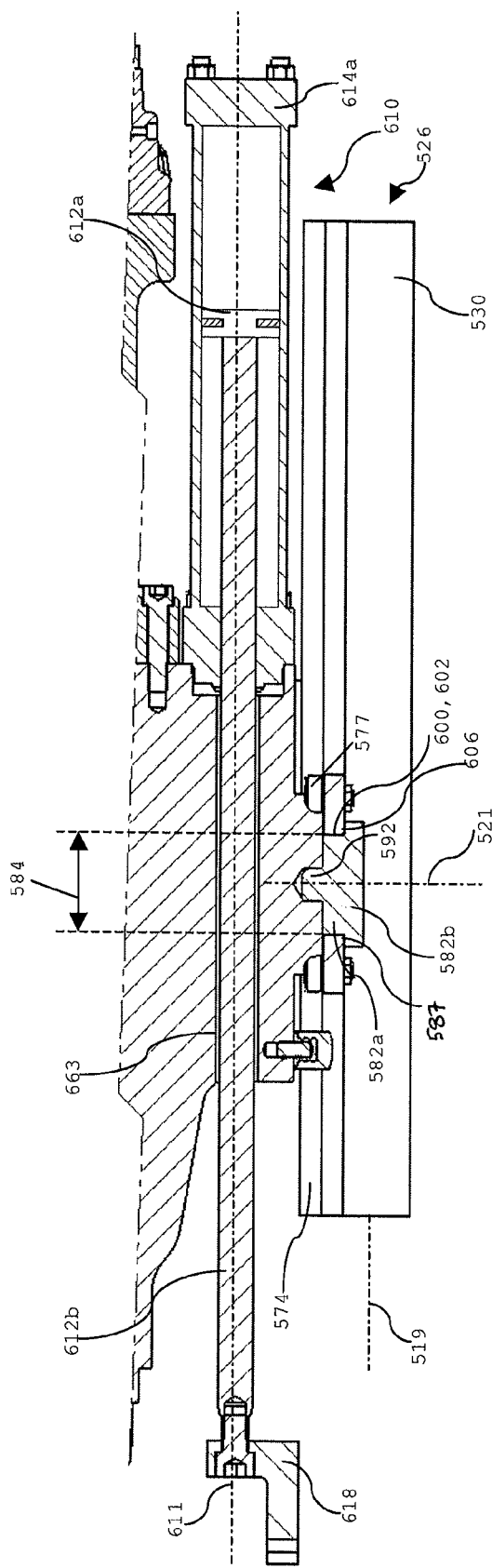
FIG. 14 is a partial section view taken along line 14-14 in FIG. 13.

In the illustrated example, the underside, downward facing bearing surface 534 of the injection unit 516 comprises two separate and laterally spaced apart bearing surface portions 534a and 534b. The bearing surface width is 535 extends from the laterally outermost edge of the first bearing surface portion 534a to the laterally outermost edge of the second bearing surface portion 534b. The bearing surface portions 534a, 534b can be configured for alignment with the two slide surface portions 532a, 532b of the two rails 530 when the injection unit is in the in-line position. The bearing surface portions 534a,b on the injection unit 516 may comprise, as in the example illustrated, replaceable bearing pads 533 that are attached to a lower portion of the injection unit 516. The bearing pads 533 can be attached to the injection unit 116 using any suitable method, including a plurality of bolts as illustrated in FIG. 13. In other examples, the bearing surface 534 can be integrally formed with the main body of the injection unit 116.

Providing a direct, weight bearing interface between the injection unit 516 and the linear support 526 can allow substantially all of the weight of the injection unit 516 to be borne by the linear support 526 which can reduce the vertical load experienced by other machine components, including, for example, the retainer 528. Reducing and/or eliminating the amount of vertical load or weight that is to be carried by the retainer 528 can facilitate smooth translation of the retainer 528 relative to the linear support 526. The mounting apparatus 518 can be configured so that no portion of the retainer 528 is disposed vertically between the bearing surface portions 534*a,b* of the injection unit 516 and the opposing sliding surface portions 532*a,b* of the linear support 526. In other words, the mounting apparatus 518 can be configured such that no portion of the retainer 528 is vertically sandwiched below the bearing surface 534 and above the slide surface 532.

The linear support 526 includes keeper portions 550 that engage the retainer 528 as it translates along the length of the linear support 526. The retainer 528 includes a corresponding retainer surface 554 to engage the keeper portions 550. In the example illustrated, the retainer body 552 is generally formed of a single, solid plate, and the material of the retainer body 552 is, in the example illustrated, tool steel. The retainer surface 554 comprises spaced apart retainer surface portions 554*a*, 554*b* which in the example illustrated are defined by portions of the upward facing upper surface of the retainer body 552 along each lateral edge thereof. Optionally, additional bearing plates or pads can be provided on the retainer body 552 to provide the retainer surfaces 554. In the example illustrated, the retaining surface 554 of the retainer 528 is disposed at an elevation below the sliding surface 532.

Figure 17:
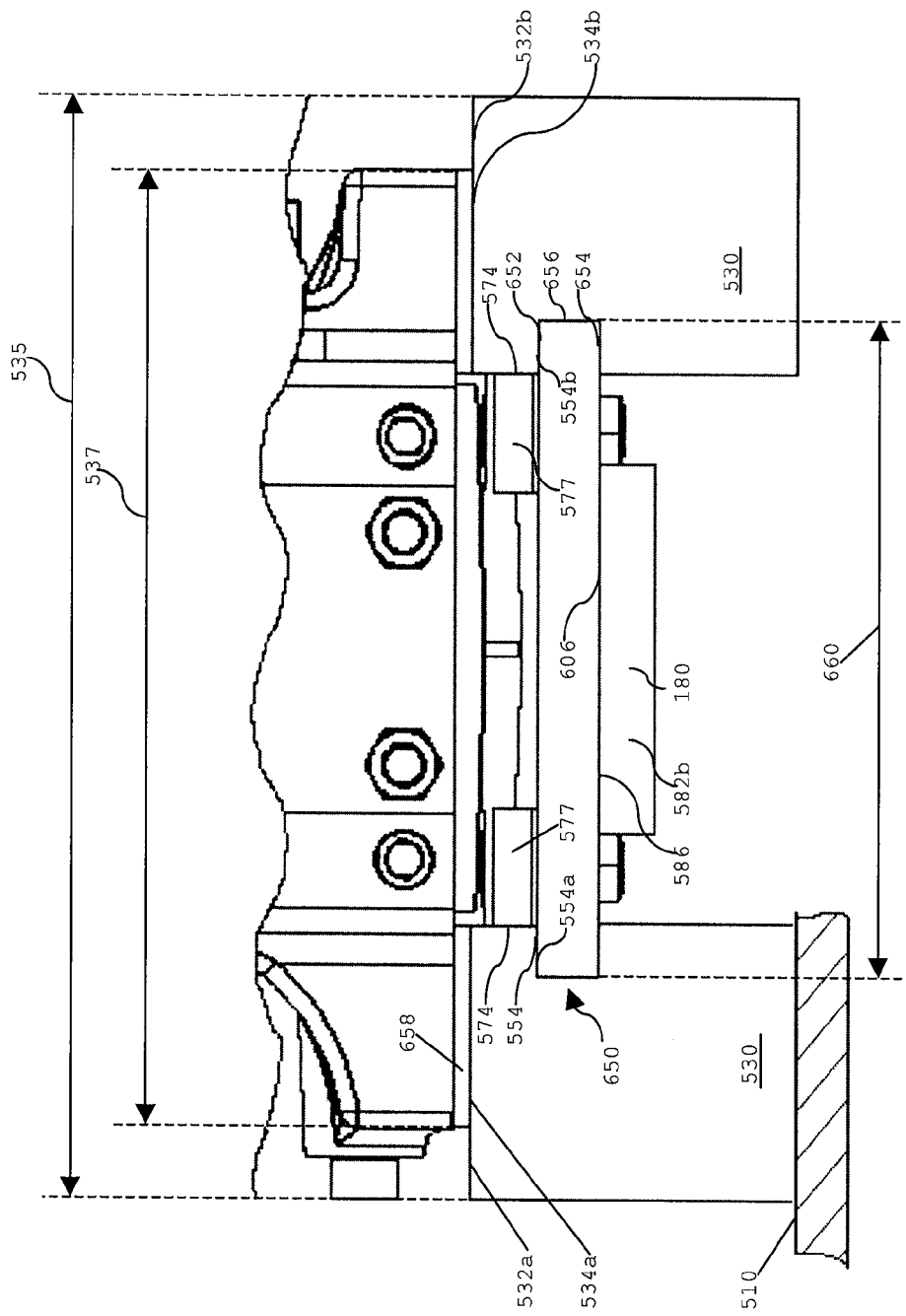
FIG. 17 is an end view of the injection unit and support of FIG. 13.

With reference to FIGS. 13 and 17, each rail 530 includes a longitudinally extending retainer channel 650 that extends the length of rail 530 (optionally the channel 650 need not extend the entire length of the rails 530). The two retainer channels 650 are positioned opposite each other and are sized and shaped to receive, retain and guide the translation of the corresponding retainer 528. Each retainer channel 650 includes a generally horizontal, downward facing channel upper surface 652, an opposing channel lower surface 654 and a generally vertical channel sidewall 656 extending therebetween. The channel sidewalls 656 are sufficiently spaced apart in the lateral direction that the retainer body 552 can be positioned between the opposing channel sidewalls 656. At least a portion of the channel upper surfaces 652 can provide all or a portion of the underside surface 557 of the keeper 550 (functioning similarly to the underside surface 157 of the keeper 150 of the linear support 126). Optionally, the retainer channels 650 need not include a channel lower surface 654 and can be formed as 2-sided channels having a generally inverted L-shaped cross-sectional shape.

In the illustrated example, the retainer 528 is configured so that it does not contact the channel lower surface 654 and is not supported from below by any portion of the linear support 526. Instead, the retainer 528 is coupled to the injection unit 516 such that the retainer 528 is suspended from and supported by the injection unit 516. In the example illustrated, no downward facing surfaces of the retainer 528 need contact any portion of the linear support 526, base 510 or other portions of the injection molding machine.

The retainer 528 includes guiding surfaces for inhibiting horizontal movement of the retainer 528 in the lateral direction, normal to the longitudinal axis 519. The guiding surfaces may contact or engage corresponding channeling surfaces of the rails 530. In the example illustrated, the retainer 528 includes four rollers 577 that provide the guiding surfaces of the retainer 528. The rollers 577 can be attached to the retainer body 552 using any suitable means. In this example, the retainer body 552 is a generally flat plate and need not include housings or seats to receive the rollers 577 (as described in the examples above) because the rollers 577 are provided above the upper surface of the retainer body 552.

Also like the example described above, in this example the rollers 577 extend laterally beyond the lateral edges to provide guiding surfaces that extend beyond the lateral edges of the retainer body 552. The rollers 577 are configured to rollingly contact the corresponding channeling edges 574 of the linear support 526, which in this example are formed by opposing vertical, inwardly facing surfaces of the rails 530.

The retainer body 552 includes a swivel seat 600 that includes a seat bore or aperture 602 for receiving a swivel member 580. In the example illustrated, the swivel member includes upper and lower portions 582*a*, 582*b* and an upward facing flange surface 587 that slidably abuts a downward facing abutment surface 606 of the retainer 528. The abutment surface 606 can be provided by a portion of the lower surface of the retainer body 552. The first diameter 584 (FIG. 14) of this swivel member 580 is sized to fit within bore 602 in the retainer, while the second diameter 586 (FIG. 15) is larger than the diameter of the bore 202 to prevent the lower portion 582*b* of the swivel member 580 from passing through the bore 602.

The swivel member 580 provides, in the example illustrated, a translational load bearing connection between the injection unit 516 and the retainer 528 that enables the translating or sliding forces exerted by an actuator 610 on one of the injection unit 516 or the retainer 528 to be transferred to the other. In the illustrated examples, the swivel member 528 provides the only translational load bearing connection between the injection unit 516 and the retainer 528.

In some examples, the swivel member 580 provides a single connection point between the injection unit 516 and the rest of the machine 500. The injection unit 516 is configured to pivot about a pivot axis 521 that is coaxial with the swivel member 580 and the injection unit 516 is not, in the example illustrated, coupled or connected to other portions of the retainer 528, linear support 526 or base 510. Providing a single connection point that serves as both a pivot point and a lateral load transfer joint between the injection unit 516 and retainer 528 may simplify the design, operation and/or maintenance of the injection molding machine 510. It can also enable the injection unit 516 to be pivoted without the need to release or decouple any additional connections between the injection unit 516 and the linear support 526.

The mounting apparatus 518 includes an actuator 610 for translating the retainer 528 and injection unit 516 relative to the linear support 526 and machine base 110. The actuator 610 includes a moving part 614 and a stationary part 612, and can operate in a manner similar to actuator 210 described above.

In the example illustrated, the actuator 610 is operably connected between the injection unit 516 and the machine base 510 (rather than being connected between, for example, the machine base 510 and the retainer body 552 as shown in other examples). In the example illustrated, the axial force exerted by the actuator 610 acts on the injection unit 516, and the retainer 528 is moved along with the injection unit 516 as a result of its connection therewith (i.e. via the swivel member 580 in the example illustrated). In other words, force from the actuator 610 is directly (or more directly) applied to the injection unit 516, and indirectly (or less directly) applied to the retainer 528.

With reference to FIG. 13, the moving part 614 of the actuator 610 comprises a cylinder housing 614a that is affixed to a back surface (i.e. away from the platens) of the injection unit 516, and the stationary portion 612 of the actuator 610 includes a piston 612a and piston rod 612b. In this example, the back surface of the injection unit 516 can be provided with any suitable actuator mounting features, including an actuator mount and cylinder seat similar to those used to connect the actuator 210 to retainer 128 described above.

In the example illustrated, the piston rod 612b of the actuator 610 extends through an actuator passage 663 that is formed in the injection unit 516. The actuator passage 663 extends generally horizontally from the rear face of a lower portion of the injection unit 516 to an opposing front face. A forward end of the piston rod 612b is connected to the machine base 110 at a position intermediate the injection unit 516 and the stationary platen 112 by connection to, for example, an anchoring block 618.

In the illustrated example, the actuator passage 663 is shown as being a cylindrical hole or tube that is sized to receive the generally round piston rod 612b. However, it is understood that both the actuator passage 663 and the piston rod 612b can be of any suitable, complimentary cross-sectional shapes. In some examples, the actuator passage 663 can be formed to be larger than the piston rod 612b so that the piston rod 612b is freely received within the passage 663 and can translate in the longitudinal direction without contacting the interior walls of the passage 663. In other examples, the actuator passage 663 may be sized to slidingly contact the piston rod 612b as the actuator 610 is activated, and the interior surface of the passage 663 can be lubricated, provided with a friction reducing liner or otherwise treated to reduce sliding friction between the piston rod 612b and the passage 663.

Securing the cylinder housing 614a to the injection unit 516 can allow the cylinder housing 614a to remain in a fixed position relative to the injection unit 516 while the injection unit is in or moving between the in-line and maintenance positions. This can simplify running services to the actuator 610, by, for example, providing fluid supply and return lines between the injection unit 516 and the cylinder housing 614a of rigid construction, rather than of flexible, movement-accommodating construction (such as hoses with enough slack to accommodate the relative movement). In use, before pivoting the injection unit 516 (with the actuator 610 attached hereto) between the in-line and maintenance positions, the piston rod 612b can be selectably disconnected from the base 510, for example by disconnecting the piston rod 612b from the anchoring block 618 or disconnecting the anchoring block 618 from the base 510.

While shown as a single actuator 610 that is aligned with the longitudinal axis 519, it is understood that the actuator 610 can include more than one actuator and can be positioned in a plurality of different configurations. In some examples, the piston rod 612b can be laterally offset so that it extends beside the injection unit 516 and need not pass through the actuator passage 663 in the injection unit 516. In some examples, the mounting apparatus may include at least one actuator in which the stationary portion (for example a cylinder housing) is pivotably coupled to the injection unit about a proximal pivot axis that is in the fixed position relative to the injection unit. The moving portion of the at least one actuator may be pivotably coupled to the machine base about a distal pivot axis. The actuator may define an actuator axis that is disposed at an acute angle relative to the longitudinal axis of the linear support, and the acute angle may change as the injection unit moves between the advanced and retracted positions.

In the example illustrated, the actuator 610 defines an actuator axis 611 that is parallel to the longitudinal axis 519 of the linear support. In the example illustrated, the actuator axis 611 is disposed at an elevation that is greater than the elevation of the swivel member 580 and the retainer 528. The vertical distance between the base 510 and the actuator axis 611 is greater than the vertical distance between either the base 510 and the retaining surface 554 or the base 510 and the uppermost surface of the locating pin 592 of the swivel member 580.

What has been described above has been intended to be illustrative of the invention and non-limiting and it will be understood by persons skilled in the art that other variants and modifications may be made without departing from the scope of the invention as defined in the claims appended hereto.

The invention claimed is:

1. An injection molding machine comprising:
    a) a base for supporting at least one platen;
    b) a linear support fixed to the base, the linear support extending parallel to a longitudinal axis;
    c) a retainer slidably and non-rotatably coupled to the linear support, the retainer translatable relative to the linear support along the longitudinal axis between retracted and advanced positions; and
    d) an injection unit pivotably coupled to the retainer, the injection unit pivotable relative to the retainer and the base, the injection unit slidably supported by the linear support and the injection unit having an injection unit weight, at least substantially all of the injection unit weight transferred to the linear support without passing through the retainer.

2. The machine of claim 1, wherein the injection unit comprises at least one bearing surface resting directly upon the linear support for transferring at least a portion of the injection unit weight thereto.

3. The machine of claim 2, wherein at least one of the bearing surface and linear support comprises a wear pad that bears at least a portion of the injection unit weight when the injection unit translates between the advanced and retracted positions.

4. The machine of claim 2, wherein the linear support comprises a pair of spaced apart rails each extending parallel to a longitudinal axis, the retainer disposed beneath the injection unit and laterally between the rails so that no portion of the retainer is vertically between a downward facing surface of the injection unit and an upward facing surface of the rails.

5. The machine of claim 4, wherein the retainer is pivotably coupled to an underside of the injection unit, the retainer generally suspended from the injection unit laterally between the rails, the retainer slidably engaging the rails for allowing axial translation of the retainer along the longitudinal axis and inhibiting lateral translation of the retainer perpendicular to the longitudinal axis.

6. The machine of claim 5, further comprising at least one linear actuator connected between the injection unit and the base for selectively translating the injection unit between the advanced and retracted positions, the at least one actuator defining an actuator axis, and the retainer disposed at an elevation below that of the actuator axis.

7. The machine of claim 6, further comprising a swivel member coupling the retainer to the injection unit, the swivel member pivotable about a pivot axis, wherein the swivel member is disposed at an elevation below the actuator axis.

8. The machine of claim 7, wherein the swivel member is pivotable relative to the retainer and fixed relative to the injection unit.

9. The machine of claim 7, wherein engagement of the swivel member with the injection unit and the retainer provides the only translational load bearing connection between the injection unit and the retainer.

10. An injection molding machine comprising:
   a) a base;
   b) a platen mounted to the base for supporting a mold portion;
   c) a linear support fixed to the base, the linear support comprising a pair of spaced apart rails each extending parallel to a longitudinal axis;
   d) a retainer slidably and non-rotatably coupled to the linear support, the retainer translatable relative to the base along the longitudinal axis between a retracted position spaced away from the platen, and an advanced position intermediate the platen and the retracted position;
   e) an injection unit translatably supported on the linear support and pivotably coupled to the retainer, the injection unit translatable with the retainer and pivotable relative to the retainer;
   f) the retainer disposed beneath the injection unit and laterally between the rails so that no portion of the retainer is vertically between a downward facing surface of the injection unit and an upward facing surface of the rails.

11. An injection molding machine comprising:
   a) a base for supporting a platen;
   b) a linear support fixed to the base, the linear support comprising a pair of spaced apart rails each extending parallel to a longitudinal axis;
   c) an injection unit bearing against and slidably supported by the rails;
   d) a retainer pivotably coupled to an underside of the injection unit, the retainer generally suspended from the injection unit laterally between the rails, the retainer slidably engaging the rails for allowing axial translation of the retainer along the longitudinal axis and inhibiting lateral translation perpendicular to the longitudinal axis;
   e) the injection unit slidable with the retainer between a retracted position spaced away from the platen, and an advanced position intermediate the platen and the retracted position and pivotable relative to the retainer and the base.

12. The machine of claim 11, wherein the linear support comprises a keeper portion and the retainer comprises an upward facing retaining surface that abuts the keeper portion to inhibit upward movement of the injection unit.

13. The machine of claim 12, further comprising an actuator drivingly connected between the injection unit and the base for selectively translating the injection unit between the advanced and retracted positions.

14. The machine of claim 13, wherein the actuator pivots with the injection unit and is pivotable relative to the retainer.

15. The machine of claim 13, wherein the actuator defines an actuator axis that is disposed at an elevation above that of the retainer.

16. The machine of claim 13, wherein the actuator comprises a moving portion mounted to the injection unit and a stationary portion coupled to the base, wherein the moving portion comprises a cylinder housing and the stationary portion comprises a piston translatably mounted within the cylinder housing and a piston rod connected to the piston, the cylinder housing mounted on a back face of the injection unit and the piston rod coupled to the base at a location longitudinally intermediate the injection unit and the platen.

17. The machine of claim 12, further comprising a swivel member coupling the retainer to the injection unit, the swivel member pivotable about a pivot axis, wherein engagement of the swivel member with the injection unit and the retainer provides the only translational load bearing connection between the injection unit and the retainer.

18. The machine of claim 12, wherein the bearing surface comprises a downward facing surface and the linear support comprises an upward facing slide surface to contact the bearing surface, and wherein the bearing surface comprises at least two spaced apart bearing surface portions and the slide surface comprises at least two spaced apart slide surface portions.

19. The machine of claim 18, wherein at least one of the bearing surface and slide surface comprises at least one wear pad affixed to the respective one of the injection unit and linear support.

20. The machine of claim 19, wherein the slide surface has a slide surface length that extends parallel to the longitudinal axis and a side surface width perpendicular thereto, and the retainer has a similarly oriented retainer length that is less than the slide surface length and a retainer width that is less than the slide surface width.

* * * * *